Figure 1:
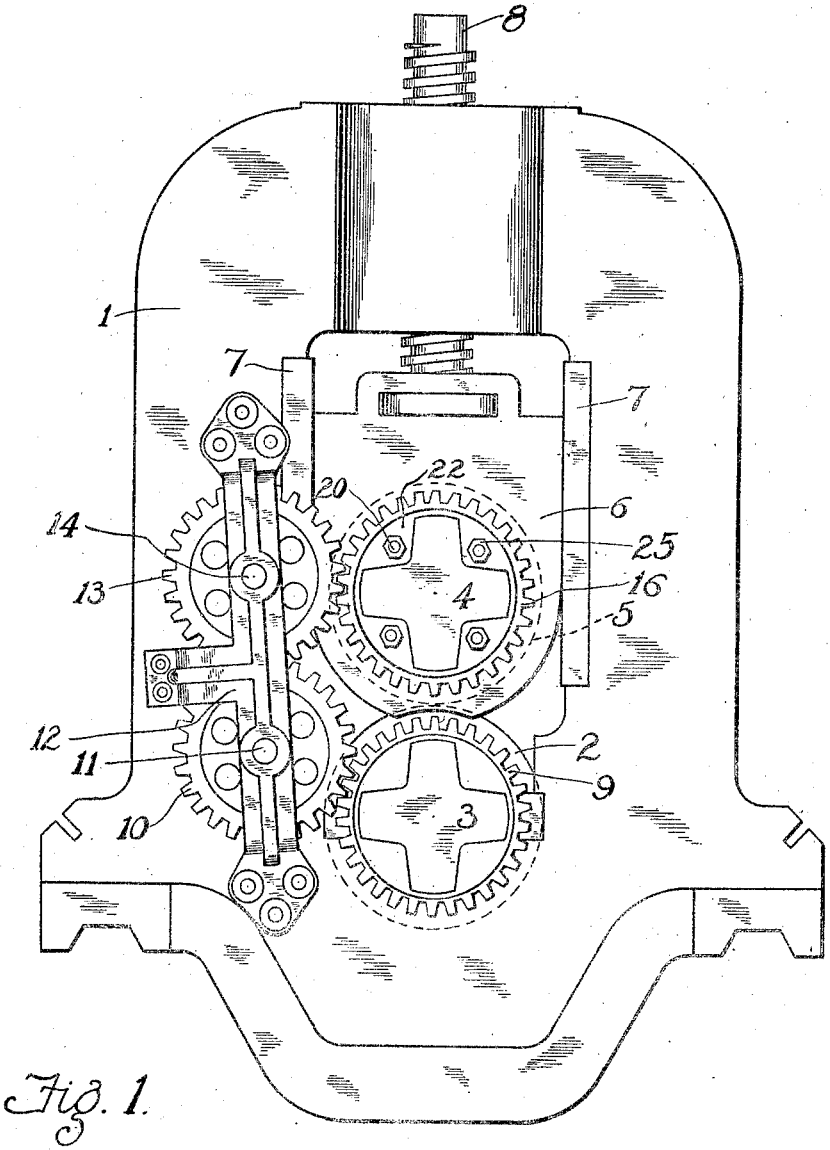

Sept. 14, 1926.

H. A. ROEMER 1,600,068

TENSION DEVICE FOR ROLLING MILLS

Filed Jan. 26, 1921   3 Sheets-Sheet 1

Inventor
Henry A. Roemer
By Frease, Merkel, Saywell and Bond
Attorney

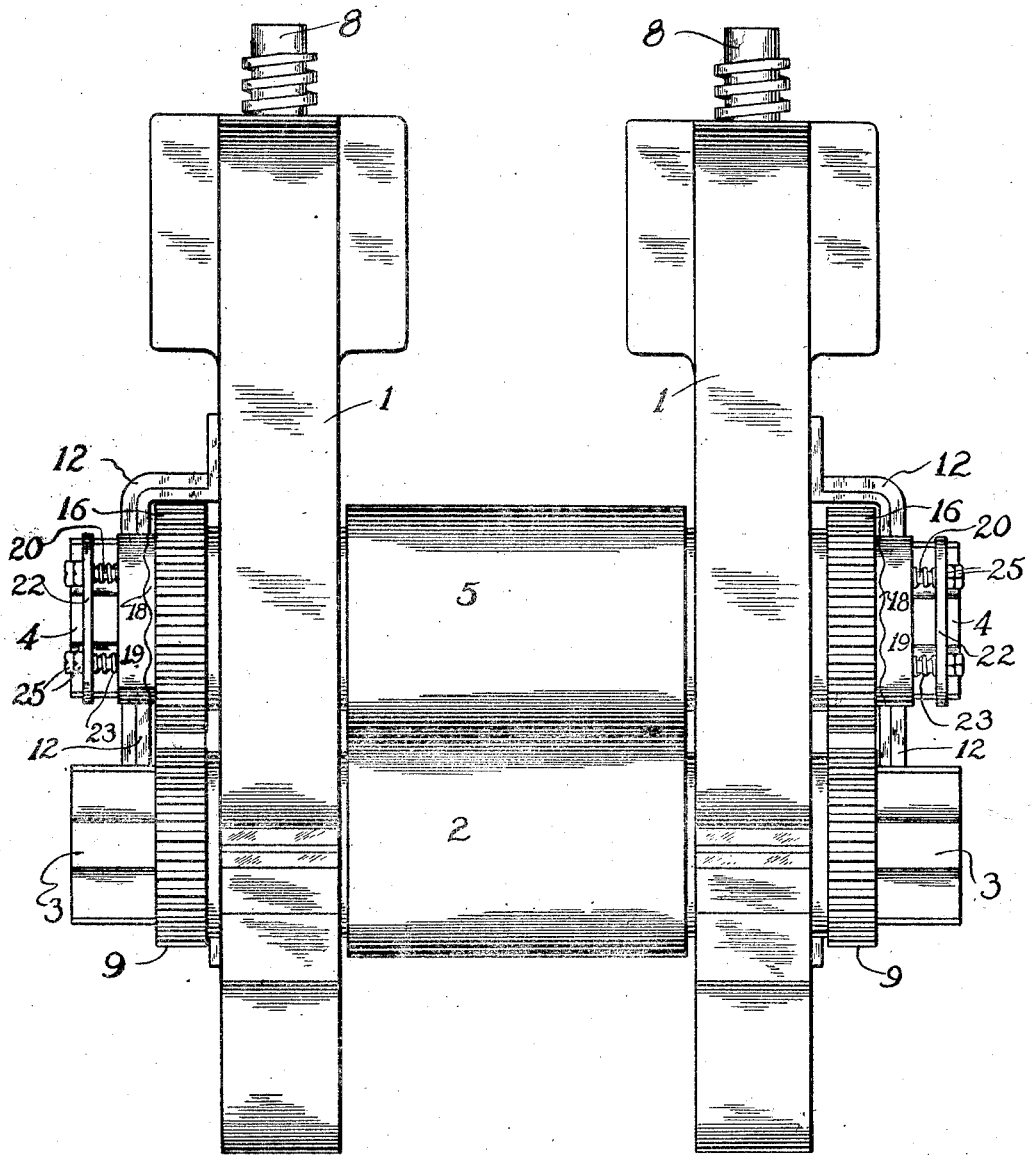

Sept. 14, 1926.  
H. A. ROEMER  
1,600,068  
TENSION DEVICE FOR ROLLING MILLS  
Filed Jan. 26, 1921  3 Sheets-Sheet 3
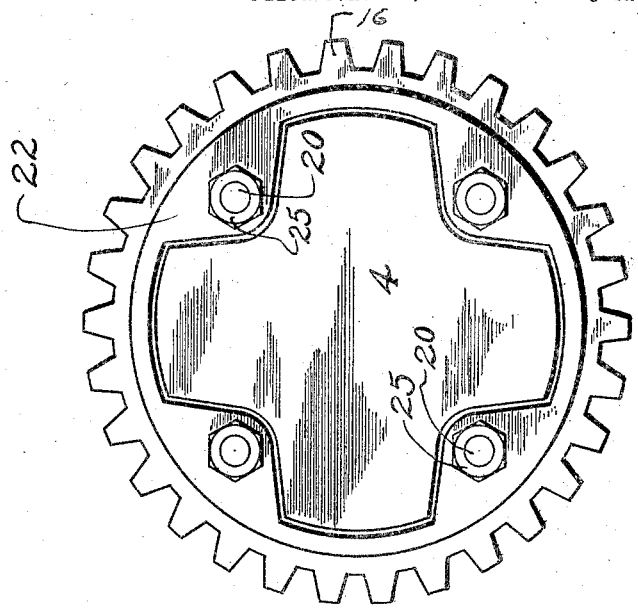
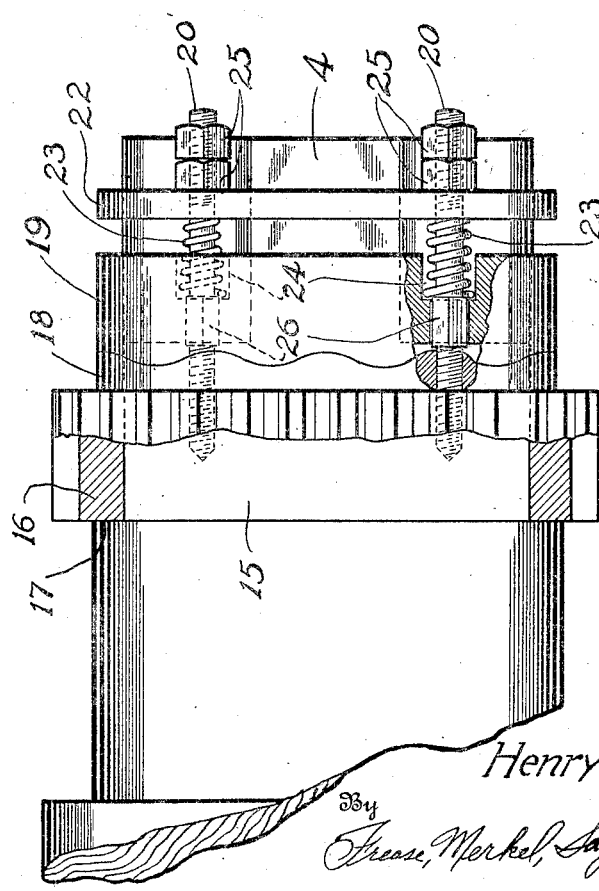
Inventor  
Henry A. Roemer Patented Sept. 14, 1926.

1,600,068

UNITED STATES PATENT OFFICE.

HENRY A. ROEMER, OF CANTON, OHIO.

TENSION DEVICE FOR ROLLING MILLS.

Application filed January 26, 1921. Serial No. 440,125.

This invention relates to rolling mills and more particularly to a tension device upon the driving mechanism of balance roughing mills such as are used for roughing or rolling sheets, bars, plates or slabs in sheet, tin, jobbing and plate mills, and is an improvement over the device shown in my copending application, Serial No. 374,284, filed April 16, 1920.

The objects of the invention are the provision of a driving mechanism for driving the upper roll of a balance roughing mill from the lower roll, regardless of the distance separating the rolls, a tension device being provided by means of which the upper roll will automatically disengage from the driving means in the event of a backlash or the like occurring during the rolling operation.

The above together with other objects are attained by providing a fixed gear upon the end of the lower roll shaft arranged to mesh at all times with an idle gear which in turn meshes with a second idle gear, both of said idle gears being mounted upon fixed bearings upon the mill housing, the second idle gear meshing with a gear ring, frictionally mounted upon the upper roll shaft and provided with an annular flange having an outer corrugated edge which is engaged by a thimble having a corresponding corrugated edge which is frictionally held in interfitting engagement with the corrugated flange upon the gear ring.

The invention thus set forth in general terms is illustrated in the accompanying drawings, forming part hereof, in which:

Figure 1 is a side elevation of a balance roughing mill embodying the invention;

Fig. 2, a front elevation thereof;

Fig. 3, a fragmentary side elevation partly in section of an end portion of the upper roll shaft showing the gear ring frictionally mounted thereon;

Fig. 4 is an end view thereof.

Similar numerals of reference indicate corresponding parts throughout the several views.

The numeral 1 indicates the housing of the mill which may be of any usual and well known construction, within which is journaled the lower roll 2, the shaft 3 thereof being located through the usual permanent bearing provided in the housing.

The shaft 4 of the upper roll 5 is journaled in a sliding bearing 6 which is mounted for vertical reciprocation in the guides 7 and arranged to be raised or lowered by means of the usual screws 8, or other well known means or devices common in balance roughing mills.

A gear 9 is fixed upon the shaft of the lower roll 2 upon the outside of the housing and meshes with a gear 10, the shaft 11 of which is journaled in a suitable bearing in the bracket 12, which is fixedly mounted upon the exterior of the housing. The gear 10 in turn meshes with a similar gear 13, the shaft 14 of which is also journaled in a suitable bearing provided in the bracket 12. The gear 10 is thus in mesh at all times with the gears 9 and 13.

The neck of the upper roll is provided with a shouldered portion 15 upon which is mounted the gear ring 16 arranged to normally engage the shoulder 17, the teeth of said ring meshing at all times with the gear wheel 13. An annular flange 18 extends outwardly from the ring 16 and is provided with a corrugated outer edge.

A thimble 19 internally apertured to fit the wobble of the shaft of the upper roll is provided with an inner corrugated edge corresponding with the corrugated edge upon the flange 18. This thimble is slidably mounted upon the upper roll shaft and normally holds the gear ring 16 in frictional engagement with the shoulder 17 upon the neck of the roll.

Pins 20 are fixed in the outer extremity of the shouldered portion 15 of the upper roll shaft and extend outwardly to the end of said shaft, a disk 22, internally apertured to fit the wobble of the roll shaft being slidably mounted upon the end portion of said roll shaft and upon said pins 20, coil springs 23 being interposed between said disk and the thimble 19, the inner extremities of said springs being preferably seated in sockets 24 formed in said timble, nuts 25 being provided upon the screw threaded extremities of the pins 20 to prevent outward movement of the disk 22, the springs 23 normally urging the thimble 19 toward the gear ring 16, holding the corrugated edges of said parts in interfitting engagement, and thus holding the gear ring in frictional engagement with the shoulder 17.

For the purpose of preventing the pins 20 from becoming accidentally loosened owing to the jarring of the mill, each of the pins may be squared for a portion of its length as shown at 26, the apertures in the thimble 19 being similarly squared to receive the squared portion of the pins and lock them against movement after the disk is placed in position thereon.

It will be seen that frictional adjustment of the gear ring is obtained by placing the desired amount of tension upon the spring 23 to allow the gear ring to slip upon the shouldered portion of the roll shaft, allowing the corrugated edge of the flange thereof to ride upon the corrugated edge of the thimble 19. This adjustment is obtained by adjusting the nuts 25 upon the threaded portions of the pins 20 to move the disk 22 toward or from the shouldered portion 15, thus providing for compression or expansion of the springs 23 as desired and placing a greater or less amount of tension upon the gear ring, allowing the gear ring to slip upon the shouldered portion of the neck of the roll at the proper time to prevent injury to the rolls and gears.

The upper roll 5 is adjustable vertically with reference to the lower roll 2, the center of the upper roll being initially located in the same horizontal plane with the center of the shaft 14 of the gear 13, but when the rolls begin to wear the center of the upper roll will be normally slightly below the center of the shaft 14 when the upper roll is at the lower limit of its movement, as shown in Fig. 1 of the drawings.

When the upper roll is raised to the upper limit of its movement, the center thereof will be slightly above the center of the shaft 14, the gear ring 16 being always in mesh with the gear 13 in any adjusted position which the roll 5 assumes during the operation of the mill.

With the construction of gearing illustrated and above described it will be seen that there will be no danger of serious injury to the mill or to the gearing.

In the event that a slab, plate or bar becomes jammed between the rolls or in the event of a back-lash of the mill, the frictionally mounted gear ring will be permitted to rotate upon the shouldered portion of the neck of the roll independently of the roll, preventing damage to the mill or the gearing.

The gearing may be provided upon one end of the mill or upon both ends as shown in Fig. 2 of the drawings, if desired, and other changes may be made within the scope of the invention.

I claim—

1. In combination with a shaft having a shouldered portion, a gear ring mounted upon said shouldered portion of the shaft, an annular flange upon said gear ring provided with a corrugated edge, pins mounted in said shouldered portion of the shaft, a thimble slidably mounted upon said pins and provided with a corrugated edge engaging the corrugated edge of the flange upon the gear ring and springs upon said pins engaging said thimble for normally holding the corrugated edge thereof in engagement with the corrugated edge of said flange.

2. In combination with a shaft having a shouldered portion, a gear ring mounted upon the shaft and frictionally engaging the shoulder, corrugations upon the gear ring, pins mounted in the shaft, a thimble slidably mounted upon the pins and provided with a corrugated edge engaging the corrugations upon the gear ring, a plate mounted upon the pins and spaced from the thimble, means for adjusting the plate longitudinally upon the pins and springs interposed between the thimble and plate for normally holding the thimble in contact with the gear ring.

3. In combination with a shaft having a shouldered portion, a gear-ring mounted upon the shouldered portion of the shaft, an annular flange upon said gear-ring provided with a corrugated edge, pins mounted in said shouldered portion, a thimble slidably mounted upon said pins and provided with a corrugated edge engaging the corrugated edge of the flange upon the gear-ring, springs upon said pins engaging said thimble for normally holding the corrugated edge thereof in interfitting engagement with the corrugated edge of said flange, and means upon said pins for adjusting the tension of the springs.

In testimony that I claim the above, I have hereunto subscribed my name.

HENRY A. ROEMER.